US009990496B2

(12) United States Patent
Adams et al.

(10) Patent No.: US 9,990,496 B2
(45) Date of Patent: *Jun. 5, 2018

(54) ANALYZING A PASSWORD-PROTECTED FILE FOR MALWARE

(71) Applicant: Juniper Networks, Inc., Sunnyvale, CA (US)

(72) Inventors: Kyle Adams, Brisbane, CA (US); Jacob Asher Langton, Oakland, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/449,342

(22) Filed: Mar. 3, 2017

(65) Prior Publication Data

US 2017/0177864 A1 Jun. 22, 2017

Related U.S. Application Data

(63) Continuation of application No. 14/674,262, filed on Mar. 31, 2015, now Pat. No. 9,594,902.

(51) Int. Cl.
*G06F 7/04* (2006.01)
*G06F 21/56* (2013.01)
*G06F 21/62* (2013.01)

(52) U.S. Cl.
CPC ......... *G06F 21/56* (2013.01); *G06F 21/6209* (2013.01); *G06F 2221/034* (2013.01)

(58) Field of Classification Search
CPC ................................ G06F 21/60; G06F 21/62
USPC ...................................................... 726/26–30
See application file for complete search history.

(56) References Cited

U.S. PATENT DOCUMENTS

| 7,730,540 | B1 | 6/2010 | Woirhaye et al. |
| 8,042,184 | B1 | 10/2011 | Batenin |
| 8,108,683 | B2 | 1/2012 | Canetti et al. |
| 8,204,809 | B1 * | 6/2012 | Wise .......... G06Q 40/00 705/35 |

(Continued)

FOREIGN PATENT DOCUMENTS

EP 1 574 929 9/2005

OTHER PUBLICATIONS

Bonneau, J., "The Science of Guessing: Analyzing an Anonymized Corpus of 70 Million Passwords," 2012 IEEE Symposium on Security and Privacy Year: 2012 pp. 538-552.*

(Continued)

*Primary Examiner* — Roderick Tolentino
(74) *Attorney, Agent, or Firm* — Harrity & Harrity, LLP

(57) ABSTRACT

A device may receive a password-protected file to be accessed for analysis. The device may identify a contextual term, associated with the password-protected file, to be used as a password to attempt to access the password-protected file. The contextual term may be identified based on at least one of: metadata associated with the password-protected file, metadata associated with a source from which the password-protected file is received, or text associated with the source from which the password-protected file is received. The device may apply the contextual term as the password to attempt to access the password-protected file.

20 Claims, 9 Drawing Sheets

(56) References Cited

U.S. PATENT DOCUMENTS

| | | | |
|---|---|---|---|
| 8,724,795 B1* | 5/2014 | Aldrich | H04M 3/51 379/265.02 |
| 8,769,680 B2 | 7/2014 | Stading | |
| 9,594,902 B2 | 3/2017 | Adams et al. | |
| 2006/0015747 A1 | 1/2006 | Van De Ven | |
| 2007/0199055 A1* | 8/2007 | Hashimoto | G06F 21/6209 726/5 |
| 2008/0141373 A1* | 6/2008 | Fossen | G06F 21/564 726/23 |
| 2011/0083181 A1 | 4/2011 | Nazarov | |
| 2011/0213807 A1* | 9/2011 | Mattsson | G06F 21/6245 707/802 |
| 2011/0296174 A1* | 12/2011 | Nakayama | H04L 69/04 713/162 |
| 2012/0079596 A1 | 3/2012 | Thomas et al. | |
| 2012/0216046 A1* | 8/2012 | McDougal | G06F 21/56 713/183 |
| 2013/0271657 A1* | 10/2013 | Park | H04N 9/44 348/525 |
| 2014/0165171 A1* | 6/2014 | Meng | G06F 21/36 726/7 |
| 2015/0281210 A1* | 10/2015 | Weisberger | H04L 63/1491 726/28 |

OTHER PUBLICATIONS

Hong et al., "The Vulnerabilities Analysis of Fuzzy Vault Using Password," 2008 Second International Conference on Future Generation Communication and Networking Year: 2008, vol. 3 pp. 76-83.*

Extended Search Report for Corresponding European Application No. 15187074.8 dated Mar. 11, 2016, 8 pages.

\* cited by examiner

US 9,990,496 B2

ANALYZING A PASSWORD-PROTECTED FILE FOR MALWARE

RELATED APPLICATION

This application is a continuation of U.S. patent application Ser. No. 14/674,262, filed Mar. 31, 2015 (now U.S. Pat. No. 9,594,902) which is incorporated herein by reference.

BACKGROUND

Malicious software ("malware") may refer to any software used to disrupt computer operations, gather sensitive information, gain access to private computer systems, or the like. Malware may refer to a variety of types of hostile or intrusive software, including a computer virus, a worm, a trojan horse, ransomware, spyware, adware, scareware, or other malicious software.

SUMMARY

According to some possible implementations, a device may receive a password-protected file to be accessed for analysis. The device may identify a contextual term, associated with the password-protected file, to be used as a password to attempt to access the password-protected file. The contextual term may be identified based on at least one of: metadata associated with the password-protected file, metadata associated with a source from which the password-protected file is received, or text associated with the source from which the password-protected file is received. The device may apply the contextual term as the password to attempt to access the password-protected file.

According to some possible implementations, a computer-readable medium may store one or more instructions that, when executed by one or more processors, cause the one or more processors to receive a password-protected file. The one or more instructions may cause the one or more processors to identify a contextual term, associated with the password-protected file, to be used as a password to attempt to access the password-protected file. The contextual term may be identified based on at least one of: first unencrypted text associated with the password-protected file, second unencrypted text associated with a source from which the password-protected file is received, or third unencrypted text associated with another file that shares a degree of similarity with the password-protected file. The one or more instructions may cause the one or more processors to apply the contextual term as the password to attempt to access the password-protected file.

According to some possible implementations, a method may include receiving, by a device, a password-protected file to be accessed for an analysis. The method may include identifying, by the device, a contextual term, associated with the password-protected file, to be used as a password to attempt to access the password-protected file. The contextual term may be identified based on at least one of: first text associated with the password-protected file, or second text associated with a source from which the password-protected file is obtained. The method may include applying, by the device, the contextual term as the password to attempt to access the password-protected file. The method may include determining, by the device, that the password-protected file has been successfully accessed based on applying the contextual term or a non-contextual term as the password. The method may include accessing, by the device, the password-protected file for the analysis.

DETAILED DESCRIPTION

The following detailed description of example implementations refers to the accompanying drawings. The same reference numbers in different drawings may identify the same or similar elements.

An anti-malware application may be capable of analyzing a file (e.g., a binary file) to determine if the file is malware. However, a malicious user may protect a malware file using a password, thereby preventing the anti-malware application from analyzing the file because the anti-malware application may not have the password to access the file. Implementations described herein may assist in accessing a password-protected file to analyze the file for malware.

Figure 1:
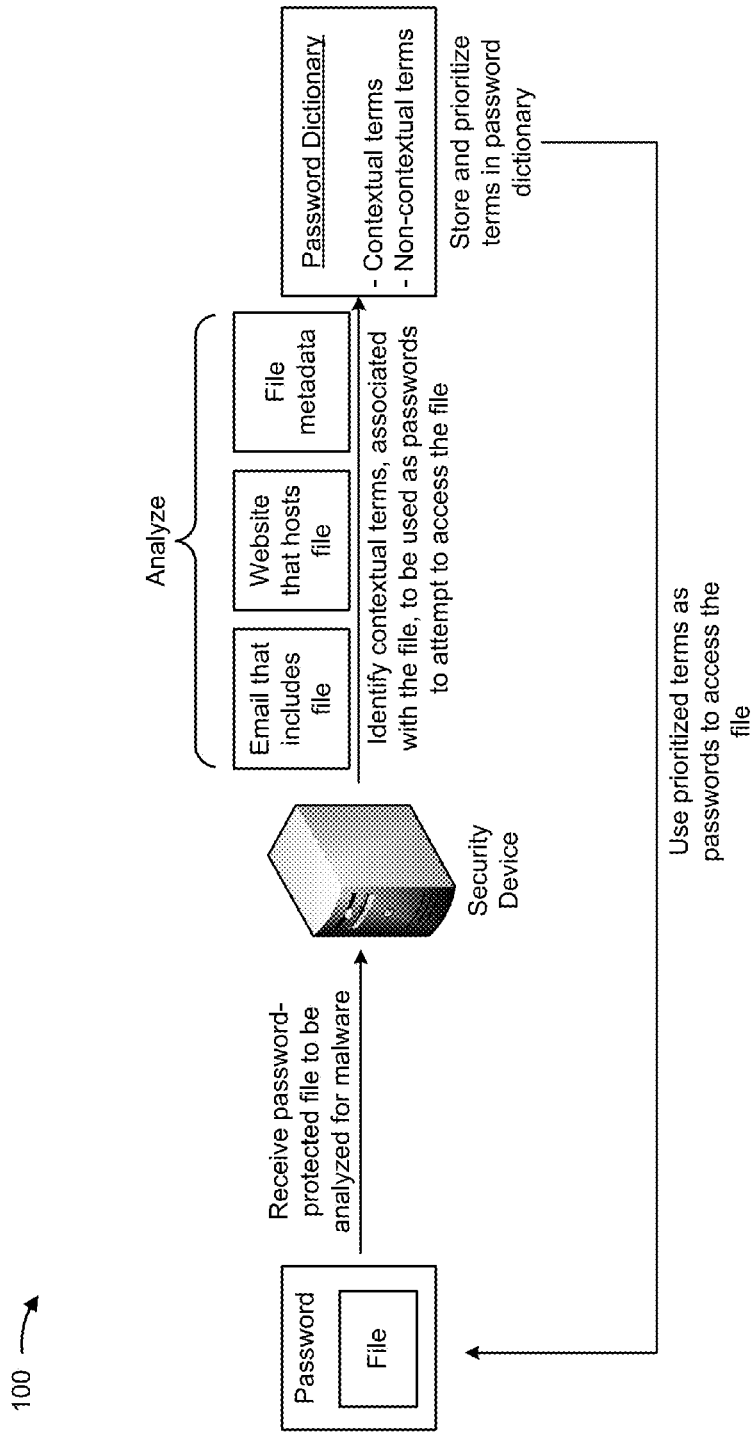
FIG. 1 is a diagram of an overview of an example implementation described herein.

FIG. 1 is a diagram of an overview of an example implementation 100 described herein. As shown in FIG. 1, a security device (e.g., a server, a firewall, a gateway, etc.) may receive a password-protected file to be analyzed for malware. As further shown, the security device may identify contextual terms, associated with the file, to be used as passwords to attempt to access the file. For example, the security device may analyze an email that includes the file, may analyze a website that hosts the file, may analyze file metadata, or the like, to identify the contextual terms. Other techniques for identifying the contextual terms are described in more detail elsewhere herein.

As further shown in FIG. 1, the security device may store the contextual terms in a password dictionary, and may store non-contextual terms in the password dictionary. In some implementations, the security device may prioritize the terms in the password dictionary, and may give the contextual terms a higher priority than the non-contextual terms. The security device may then use the prioritized terms as passwords to attempt to access the file so that the file may be analyzed for malware. By prioritizing the contextual terms, the security device may ensure that contextual terms, which may be more likely to be a password for the file than non-contextual terms, are applied as a password before the non-contextual terms. In this way, the security device may conserve processing resources. Furthermore, the security device may permit a password-protected file to be analyzed for malware when the password-protected file is protected by a password that can be determined based on the context of the file (e.g., based on text included in an email message that includes the file, a website that includes the file, etc.).

Figure 2:
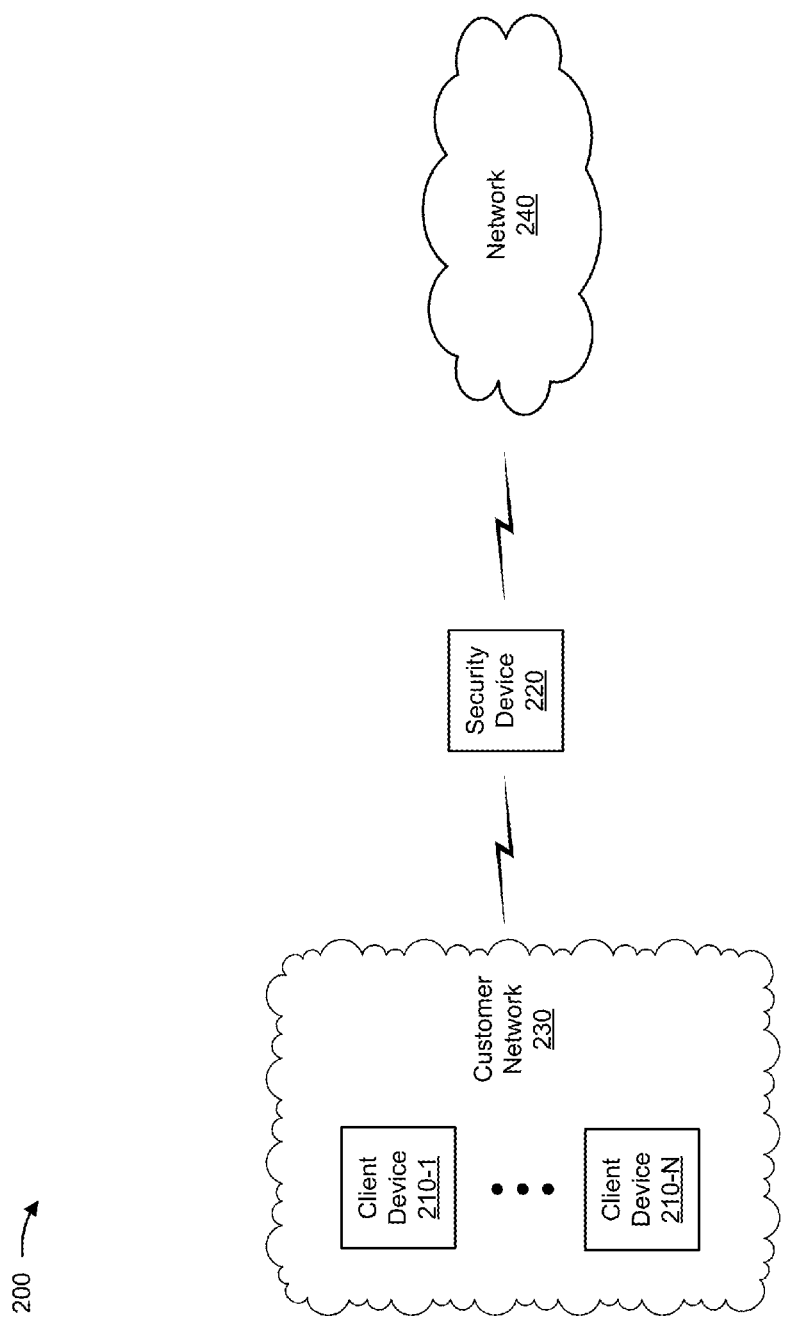
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N>1) (hereinafter referred to collectively as "client devices 210," and individually as "client device 210"), a security device 220, a customer network 230, and a network 240. Devices of environment 200 may interconnect via wired connections, wireless connections, or a combination of wired and wireless connections.

Client device 210 may include one or more devices capable of accessing and/or executing a file. For example, client device 210 may include a desktop computer, a laptop computer, a tablet computer, a mobile phone (e.g., a smart phone, a radiotelephone, etc.), a server, or a similar type of device. In some implementations, client device 210 may be a target of a malware attack, and may receive a file that includes malware. When executed, the malware may be harmful to client device 210 and/or information stored by client device 210. In some implementations, client device 210 may reside on customer network 230.

Security device 220 may include one or more devices capable of processing and/or transferring network traffic associated with client device 210, and/or capable of providing a security service (e.g., a malware detection service) for client device 210 and/or customer network 230. For example, security device 220 may include a gateway, a firewall, a router, a bridge, a hub, a switch, a load balancer, a reverse proxy, an access point, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may receive a password-protected file, may identify contextual terms associated with the file, and may store the contextual terms in a password dictionary. Security device 220 may use the password dictionary to attempt to access the password-protected file. Additionally, or alternatively, security device 220 may execute an anti-malware detection application to determine whether the file is malware (e.g., after the file has been accessed using a term in the password dictionary). As an example, security device 220 may access and/or analyze a password-protected file requested by and/or provided to client device 210 (e.g., before the file is provided to client device 210, after the file is provided to client device 210, etc.). In some implementations, security device 220 may access and/or analyze the file in a sandbox environment.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 may attempt to access and/or analyze a password-protected file, requested by client device 210 from a device (e.g., a server) associated with network 240, to determine whether the file is malware. Additionally, or alternatively, a password-protected file may be pushed to client device 210 (e.g., from a device associated with network 240), and security device 220 may attempt to access and/or analyze a password-protected file to determine whether the file is malware.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
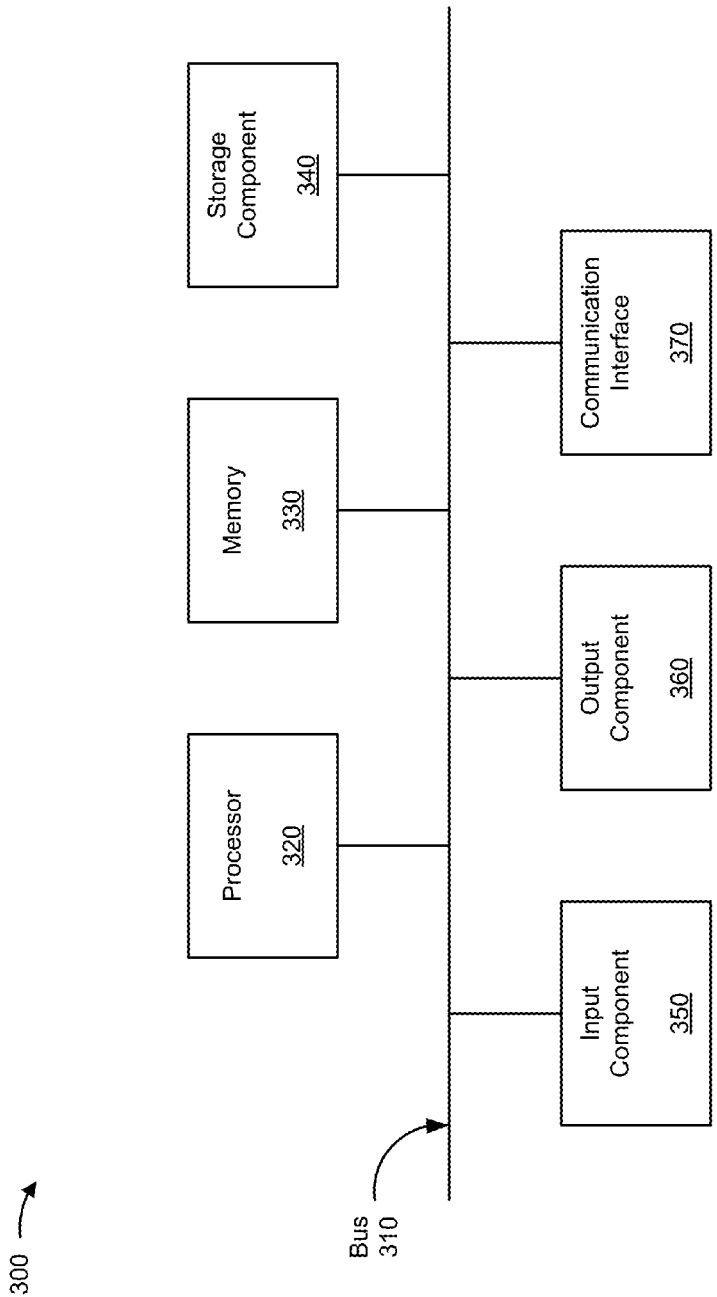
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
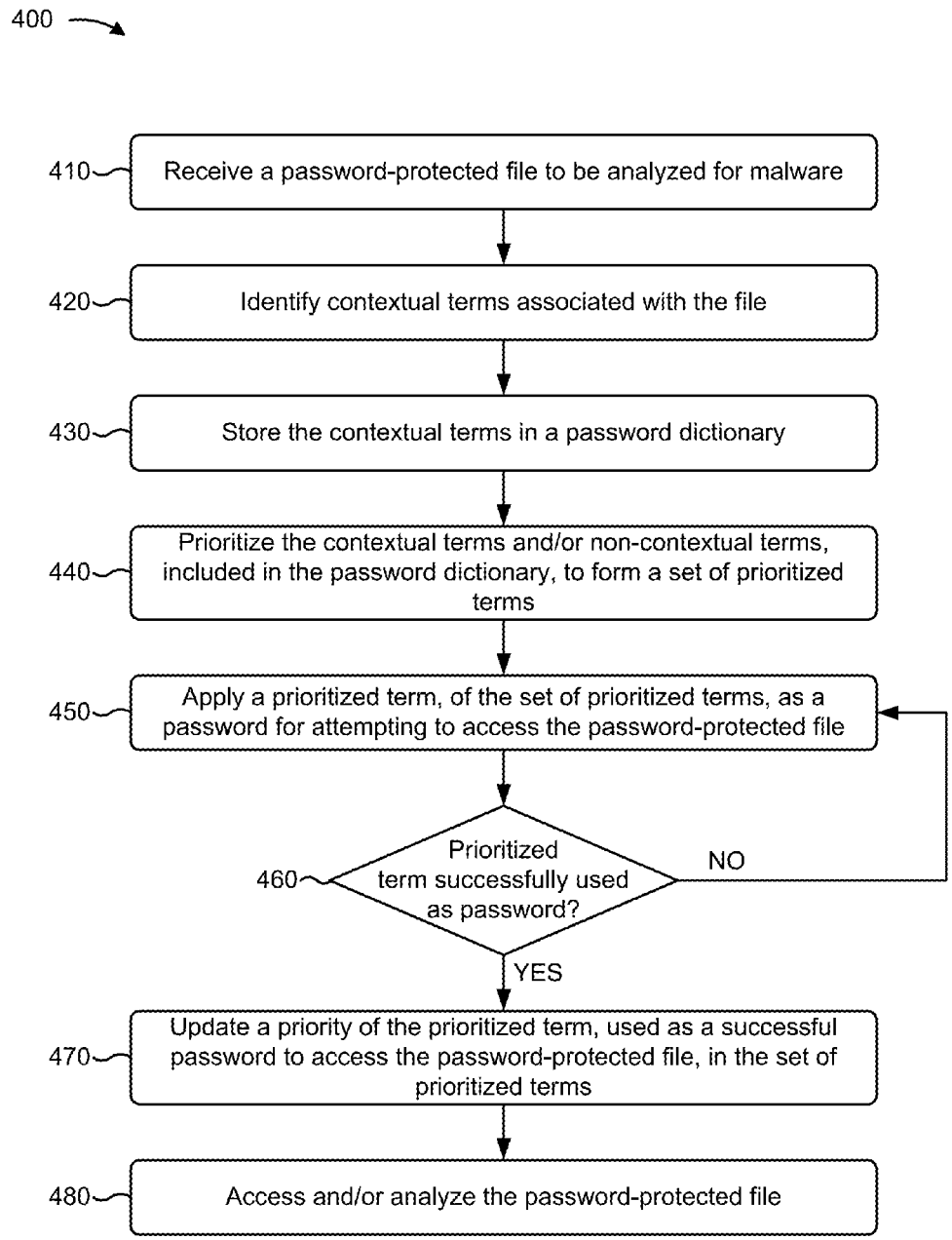
FIG. 4 is a flow chart of an example process for accessing a password-protected file so that the password-protected file may be analyzed for malware.

FIG. 4 is a flow chart of an example process 400 for accessing a password-protected file so that the password-protected file may be analyzed for malware. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include receiving a password-protected file to be analyzed for malware (block 410). For example, security device 220 may receive a set of (e.g., one or more) password-protected files (e.g., a single file protected by a password, multiple files protected by a password, a single file protected by multiple passwords, multiple files protected by multiples passwords, etc.). In some implementations, the file may be an archive file that includes the set of files and metadata associated with the archive file and/or the set of files. The set of files may be password-protected, such that the set of files may not be accessed without using the password.

In some implementations, the set of files may include malware, and security device 220 and/or another device may include an anti-malware application to analyze the set of files for malware. However, if the set of files is password-protected, the anti-malware application may be unable to access the set of files for the analysis. Implementations described herein may permit security device 220 (and/or another device) to access the password-protected set of files, for analysis, by identifying a password for the set of files using contextual information associated with the set of files.

In some implementations, the password-protected set of files may be associated with client device 210. For example, the set of files may be stored by client device 210, may be executed or accessed on client device 210, may be requested by client device 210, or the like. In some implementations, client device 210 may request the set of files from a device associated with network 240 (e.g., a web server, a host server, etc.). In this case, security device 220 may receive the request, may request the set of files from the device, may receive the set of files from the device, may access the password-protected set of files, and may determine whether the set of files includes malware before sending the set of files to client device 210. If security device 220 determines that the set of files includes malware (e.g., based on performing one or more of the operations described herein), security device 220 may prevent the set of files from being provided to client device 210. If security device 220 determines that the set of files does not include malware, then security device 220 may provide the set of files to client device 210.

Additionally, or alternatively, the password-protected set of files may be pushed to client device 210 by a device associated with network 240. In this case, security device 220 may receive the password-protected set of files (e.g., may intercept the set of files before the set of files is received by client device 210, may obtain the set of files after the set of files is received by client device 210, etc.), may access the password-protected set of files, and may determine whether the set of files includes malware before sending the set of files to client device 210. If security device 220 determines that the set of files includes malware (e.g., based on performing one or more of the operations described herein), security device 220 may prevent the set of files from being provided to client device 210. If security device 220 determines that the set of files does not include malware, then security device 220 may provide the set of files to client device 210. Additionally, or alternatively, security device 220 may provide a notification, to client device 210, regarding whether the set of files includes malware.

As further shown in FIG. 4, process 400 may include identifying contextual terms associated with the file (block 420). For example, security device 220 may identify one or more contextual terms associated with the set of files. A contextual term may include a term associated with the set of files, a term associated with an archive file that includes the set of files, a term associated with a source from which the set of files is accessed (e.g., an email from which the set of files is accessed, a website from which the set of files is accessed, a text message from which the set of files is accessed, etc.), or the like. A term, as used herein, may refer to a particular combination of characters, such as a word, multiple words (e.g., a phrase, a sentence, etc.), a character, multiple characters (e.g., a character string), or the like.

In some implementations, security device 220 may identify a contextual term associated with the set of files. For example, the contextual term may be a term included in metadata associated with one or more files included in the set of files (e.g., a file name of a file, a file property of a file, a file type of a file, a company name associated with a file, a product name associated with the file, a user name associated with a file, a comment associated with the file, or the like). In some implementations, security device 220 may identify the contextual term based on unencrypted information (e.g., unencrypted metadata) associated with the set of files.

Additionally, or alternatively, security device 220 may identify a contextual term associated with an archive file that includes the set of files. For example, the contextual term may be a term included in metadata associated with the archive file (e.g., an archive name of the archive file, an archive property of the archive file, an archive type of the archive file, a company name associated with the archive file, a product name associated with the archive file, a user name associated with the archive file, a comment associated with the archive file, or the like). In some implementations, security device 220 may identify the contextual term based on unencrypted information (e.g., unencrypted metadata) associated with the archive file.

Additionally, or alternatively, security device 220 may identify a contextual term associated with a source from which the set of files is accessed (e.g., received, obtained, downloaded, loaded, etc.). The source may include, for example, an email message, a website, a text message (e.g., a short message service (SMS) text message, a multimedia messaging service (MMS) text message, etc.), a social media message, or the like. In some implementations, the contextual term may be a term included in metadata associated with the source (e.g., a source name associated with the source, such as a website name; a source property of the source, such as a language of text associated with the source; a source type associated with the source; a company name associated with the source; a product name associated with the source; a user name associated with the source, such as a user name of a user that posted the file, a user name of a user that downloaded the file, etc.; information associated with an application used to access the set of files from the source, such as an application name, a browser name, an email application name, a text message application name, etc.; or the like).

In some implementations, the source may be associated with text, such as text included in the email message, text included in the website (e.g., text included in a webpage of the website), text included in the text message, text included in the social media message, or the like. Security device 220 may analyze the text to identify a contextual term. For example, security device 220 may tokenize the text (e.g., using lexical analysis) to form the contextual terms (e.g., by segmenting the text into contextual terms).

Additionally, or alternatively, the source may be associated with a link, such as a uniform resource identifier (URI), that identifies a resource. For example, the email message may include a link to a resource (e.g., a website), the website may include a link to a resource (e.g., another website), the text message may include a link to a resource (e.g., a website), the social media message may include a link to resource (e.g., a website), or the like. In this case, security device 220 may access the resource (e.g., by following the link), and may identify a contextual term based on accessing the resource. For example, the resource may include a website, and security device 220 may determine one or more contextual terms associated with the website (e.g., based on metadata associated with the website, based on tokenizing terms included in text of the website, etc.).

In some implementations, security device 220 may analyze the password-protected set of files (e.g., a password-protected archive file) to identify a similar set of files that was previously analyzed (e.g., by security device 220). For example, security device 220 may determine that a difference, between metadata associated with a first set of files and metadata associated with a second, previously-analyzed, set of files, satisfies a threshold (e.g., the difference is less than a threshold). Based on this determination, security device 220 may identify a contextual term, for the first set of files, based on contextual terms and/or terms included in a password dictionary used for the second set of files. In some implementations, the second set of files may share a degree of similarity with the first set of files.

In some implementations, security device 220 may apply one or more transformation techniques to a contextual term to identify one or more additional contextual terms. For example, security device 220 may change an order of one or more characters (e.g., to create permutations of contextual terms), may change case of a contextual term (e.g., may change characters to uppercase characters, may change characters to lowercase characters, may perform mathematical operations, etc.), or the like.

As further shown in FIG. 4, process 400 may include storing the contextual terms in a password dictionary (block 430). For example, security device 220 may store one or more contextual terms, identified as described above, in a password dictionary. A password dictionary may refer to a set of terms (e.g., a list of one or more terms) that may be used to attempt to access the password-protected set of files. For example, terms included in the password dictionary may be applied sequentially as a password to access the password-protected file until a successful password is used to successfully access the set of files and/or until all terms included in the password dictionary have been applied.

In some implementations, security device 220 may store one or more non-contextual terms in the password dictionary (e.g., one or more terms other than the contextual terms). For example, the password dictionary may include non-contextual terms identified based on a stored dictionary (e.g., a standard dictionary, a default dictionary, etc.).

As further shown in FIG. 4, process 400 may include prioritizing the contextual terms and/or non-contextual terms, included in the password dictionary, to form a set of prioritized terms (block 440). For example, security device 220 may prioritize terms included in the password dictionary (e.g., contextual terms and/or non-contextual terms) to form a set of prioritized terms. A prioritized term, in the set of prioritized terms, may be associated with a priority that determines an order in which the prioritized term is applied as a password to attempt to access the password-protected set of files (e.g., an order relative to other prioritized terms included in the set of prioritized terms). For example, a term with a higher priority may be applied before a term with a lower priority.

In some implementations, security device 220 may assign a higher priority to contextual terms as compared to non-contextual terms. Likewise, security device 220 may assign a lower priority to non-contextual terms as compared to contextual terms. Additionally, or alternatively, security device 220 may assign different priorities to contextual terms based on a manner in which the contextual terms were identified. For example, a contextual term identified from metadata associated with the set of files may be assigned a first priority (e.g., higher, lower, or the same as another priority), a contextual term identified from metadata associated with the archive file may be assigned a second priority (e.g., higher, lower, or the same as another priority), a contextual term identified from metadata associated with a source from which the set of files was accessed may be assigned a third priority (e.g., higher, lower, or the same as another priority), a contextual term identified based on tokenizing text included in the source may be assigned a fourth priority (e.g., higher, lower, or the same as another priority), a contextual term identified based on a similar file may be assigned a fifth priority (e.g., higher, lower, or the same as another priority), etc.

In some implementations, security device 220 may prioritize a term included in the password dictionary based on whether the term was used as a successful password in the past to access a password-protected set of files. For example, a first term that has been identified as a successful password (e.g., based on successfully applying the term in the past to access a password-protected set of files) may be assigned a higher priority than a term that has not been identified as a successful password. In this way, security device 220 may conserve processing resources by applying a term more likely to be a password before applying a term less likely to be a password. In some implementations, security device 220 may assign one or more priorities based on configuration information, which may be input by a user.

In some implementations, if a term is included in the password dictionary multiple times, security device 220 may remove all but one instance of the term. For example, if a contextual term is also included in a standard dictionary, security device 220 may remove the term from the standard dictionary, and may keep the term as a contextual term, when storing terms in the password dictionary.

As further shown in FIG. 4, process 400 may include applying a prioritized term, of the set of prioritized terms, as a password for attempting to access the password-protected file (block 450), and determining whether the prioritized term is successfully used as a password (block 460). For example, security device 220 may apply, in priority order, a prioritized term, from the set of prioritized terms, as a password to attempt to access the password-protected set of files. Security device 220 may apply a term as a password, and may determine whether the term was successfully used as a password to access the password-protected set of files. In some implementations, security device 220 and/or multiple security devices 220 may apply multiple terms in parallel (e.g., using parallel processing techniques, using a GPU, using an FPGA, using specialized hardware, etc.).

In some implementations, security device 220 may determine whether the term was successfully used as a password by determining whether a checksum, associated with one or more files, is valid. Additionally, or alternatively, security device 220 may determine whether the term was successfully used as a password by determining whether one or more files were successfully accessed (e.g., extracted). Additionally, or alternatively, security device 220 may determine whether the term was successfully used as a password by determining whether one or more files are organized according to a recognizable file structure. Additionally, or alternatively, security device 220 may determine whether the term was successfully used as a password by using a file identifier application to determine whether one or more files are of a particular file type (e.g., .exe, .dll, .doc, etc.). For example, security device 220 may determine whether accessed information, identified after applying the term as a password, represents arbitrary binary data or a recognizable file type.

As further shown in FIG. 4, if the prioritized term is not successfully used as a password (block 460—NO), then process 400 may include returning to block 450. For example, if a first term is not successfully used as a password to access (e.g., extract) the set of files, then security device 220 may return to block 450 to apply a second term (e.g., with a lower priority than the first term), of the set of prioritized terms, as a password for attempting to access the password-protected set of files. In some implementations, if security device 220 has applied every term in the set of prioritized terms without identifying a successful password, then security device 220 may prevent the password-protected set of files from being accessed (e.g., by client device 210). In some implementations, if security device 220 has applied every term in the set of prioritized terms without identifying a successful password, then security device 220 may permit access to the password-protected set of files (e.g., by client device 210).

As further shown in FIG. 4, if the prioritized term is successfully used as a password (block 460—YES), then process 400 may include updating a priority of the prioritized term, used as a successful password to access the password-protected file, in the set of prioritized terms (block 470). For example, if security device 220 successfully applies a term as a password to access the password-protected set of files, then security device 220 may update a priority of the term. In some implementations, security device 220 may associate the term with a higher priority than was previously associated with the term. Additionally, or alternatively, security device 220 may reuse contextual terms, non-contextual terms, a password dictionary, a set of prioritized terms, and/or a successfully used term when attempting to access a password-protected set of files at a later time. In this way, terms that were successfully used as passwords may be attempted earlier, thereby reducing processing time and conserving computing resources.

As further shown in FIG. 4, process 400 may include accessing and/or analyzing the password-protected file (block 480). For example, security device 220 may access (e.g., extract) the password-protected set of files based on successfully applying a term as a password. In some implementations, security device 220 may analyze the set of files for malware. Additionally, or alternatively, security device 220 may provide the set of files to another device for a malware analysis. In this way, security device 220 may permit password-protected files to be analyzed for malware, thereby increasing data security.

While techniques are described herein as being applicable to access a password-protected set of files that are protected by a single password, these techniques may be applied to access a password-protected set of files that are protected by multiple passwords, by a user name and a password, or by some other combination of credentials. In this case, security device 220 may use the same contextual terms, non-contextual terms, password dictionary, set of prioritized terms, etc. for different credentials, in some implementations. In some implementations, security device 220 may use different contextual terms, non-contextual terms, password dictionaries, set of prioritized terms, etc. for different credentials.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of accessing a password-protected file so that the password-protected file may be analyzed for malware.

Figure 5A:
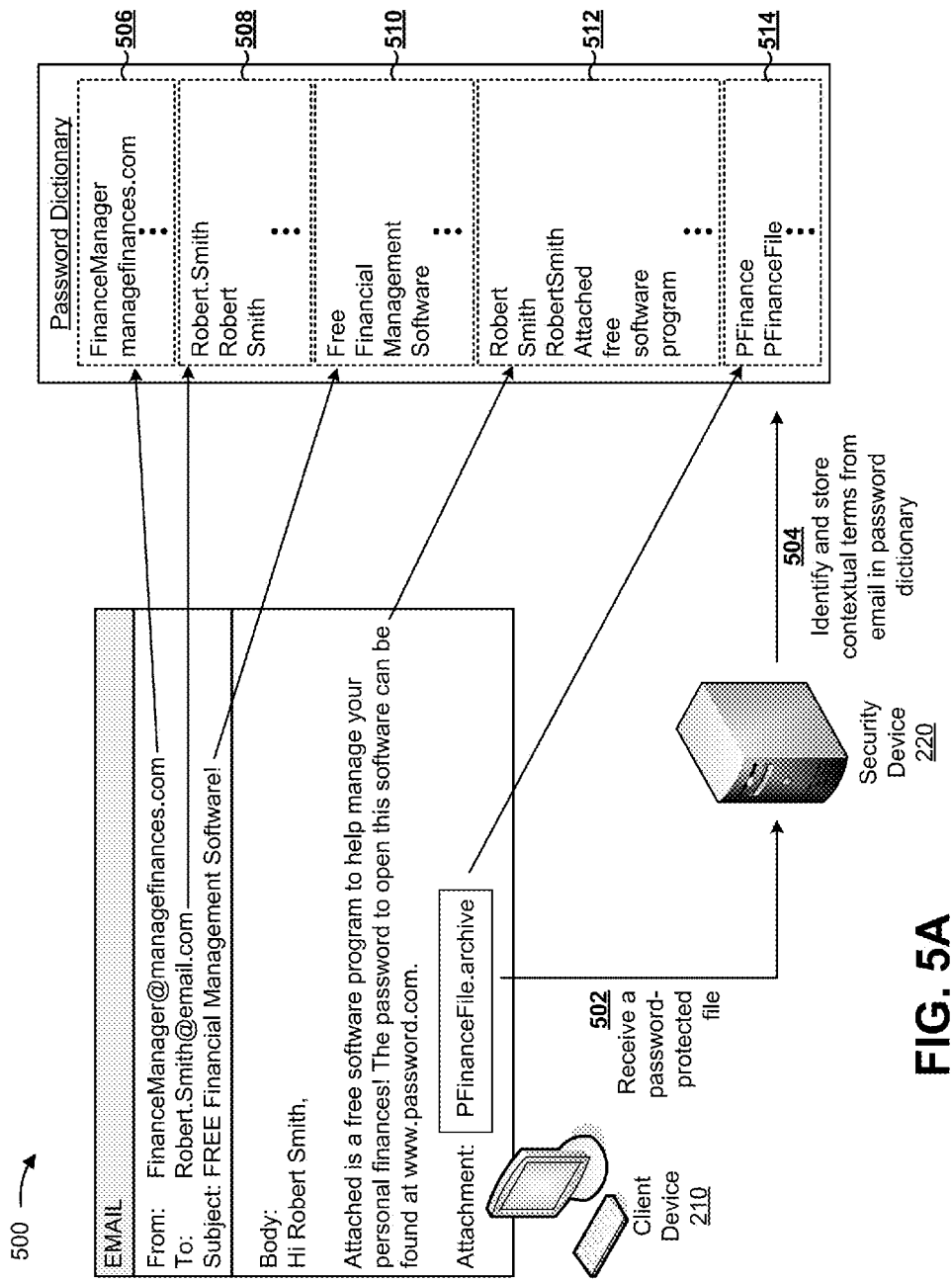
FIGS. 5A-5E are diagrams of an example implementation relating to the example process shown in FIG. 4.

As shown in FIG. 5A, assume that a user interacts with client device 210 to request an archive file included as an attachment to an email received by the user. Assume further that the archive file, shown as "PFinanceFile.archive," is protected by a password. As shown by reference number 502, assume that security device 220 receives the archive file before the archive file is provided to client device 210, and attempts to access the archive file and analyze the archive file for malware before the archive file is provided to client device 210. As shown by reference number 504, assume that security device 220 identifies and stores contextual terms, from the email, in a password dictionary.

For example, and as shown by reference number 506, assume that security device 220 identifies and stores contextual terms associated with a sender of the email message (e.g., text included in an email address of a sender). As another example, and as shown by reference number 508, assume that security device 220 identifies and stores contextual terms associated with a recipient of the email message (e.g., text included in an email address of a recipient). As another example, and as shown by reference number 510, assume that security device 220 identifies and stores contextual terms associated with a subject of the email message (e.g., text included in a subject line of the email message). As another example, and as shown by reference number 512, assume that security device 220 identifies and stores contextual terms associated with a body of the email message (e.g., text included in the body of the email message). As another example, and as shown by reference number 514, assume that security device 220 identifies and stores contextual terms associated with an attachment of the email message (e.g., text included in a file name of the attachment, or the archive file being analyzed). Further, assume that the email message includes a link to a website, shown as "www.password.com."

Figure 5B:
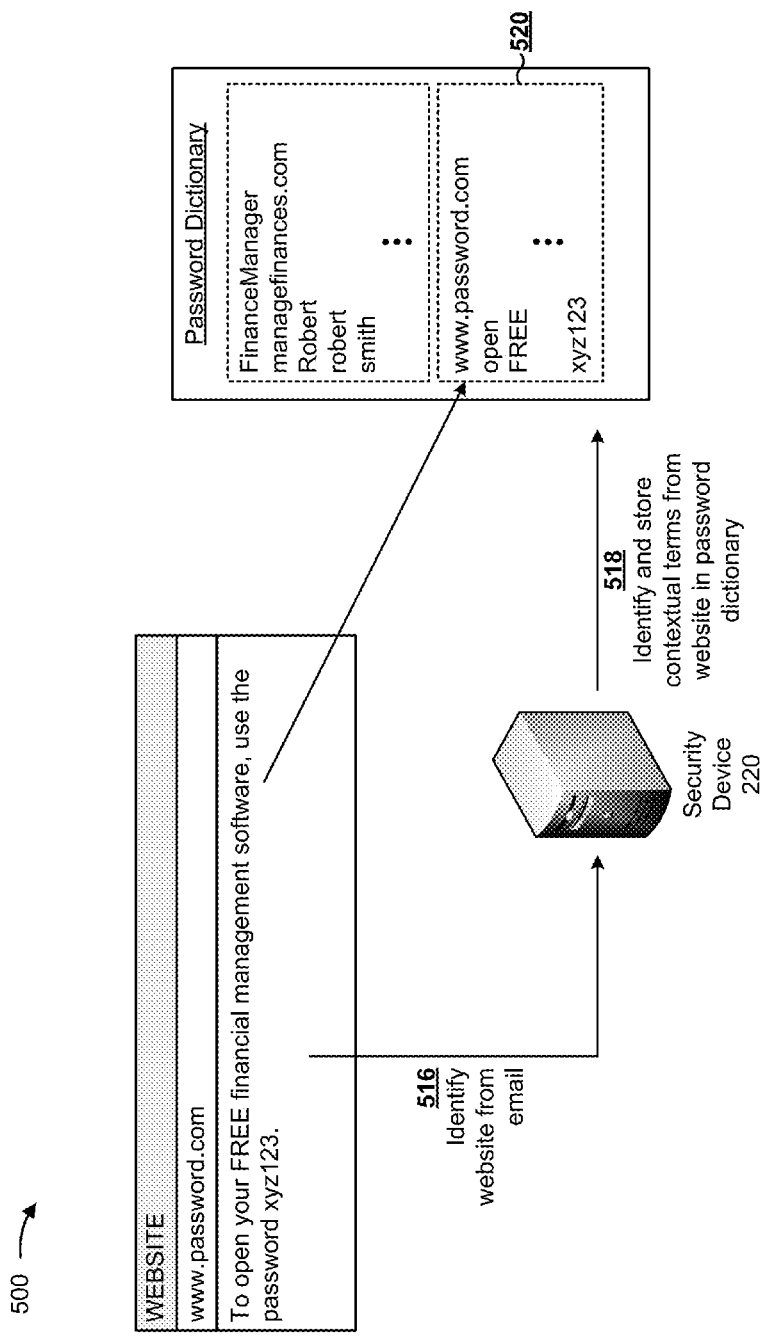

As shown in FIG. 5B, and by reference number 516, assume that security device 220 identifies the website from the email message (e.g., www.password.com). As shown by reference number 518, assume that security device 220 identifies and stores contextual terms, from the website, in a password dictionary. As an example, and as shown by reference number 520, assume that security device 220 identifies and stores contextual terms from text included in a web address of the website, text included in the website, or the like.

Figure 5C:
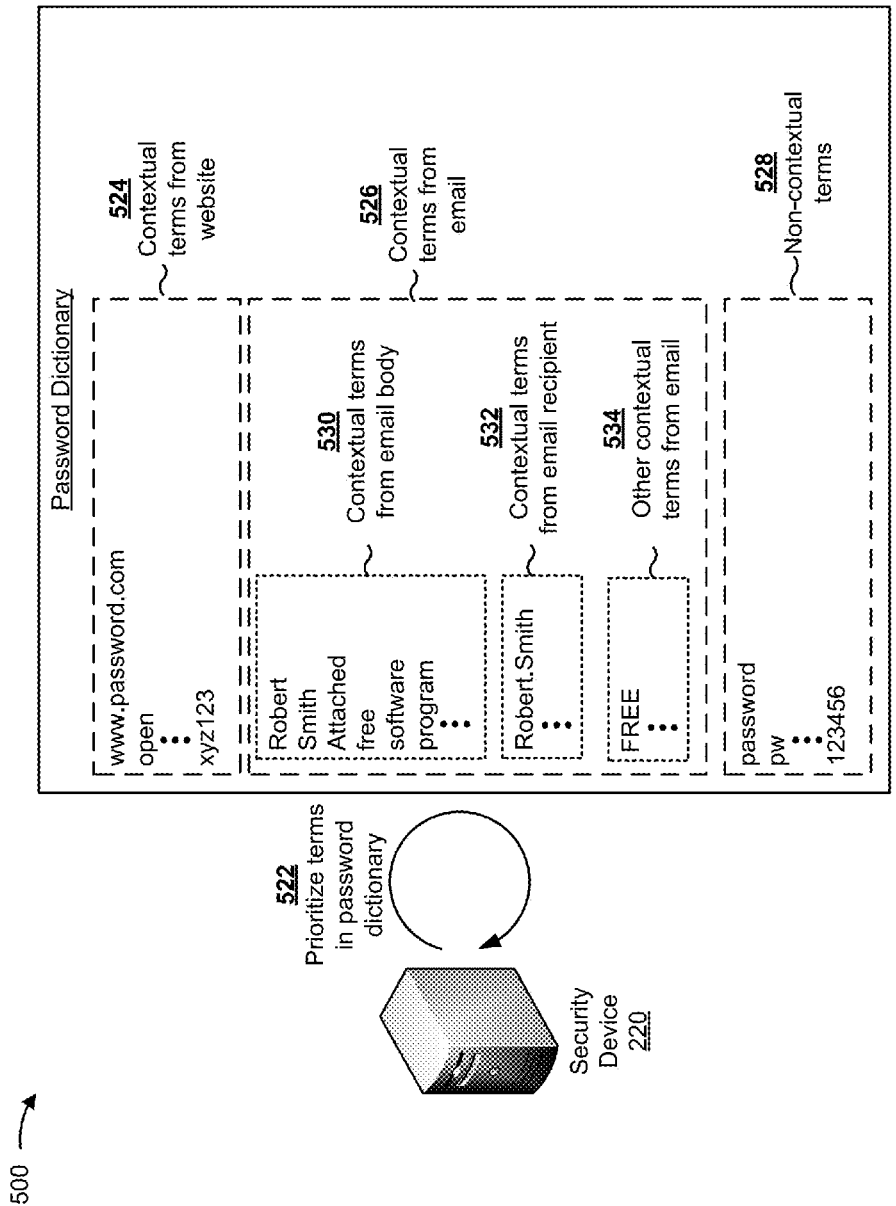

As shown in FIG. 5C, and by reference number 522, assume that security device 220 prioritizes terms, included in the password dictionary, to form a set of prioritized terms. As an example, and as shown by reference number 524, assume that security device 220 assigns a first priority (e.g., a high priority) to contextual terms determined based on the website. As another example, and as shown by reference number 526, assume that security device 220 assigns a second priority (e.g., a medium priority) to contextual terms determined based on the email. As another example, and as shown by reference number 528, assume that security device 220 assigns a third priority (e.g., a low priority) to non-contextual terms (e.g., terms from a standard dictionary).

As further shown, security device 220 may further prioritize the contextual terms determined based on the email. As an example, and as shown by reference number 530, assume that security device 220 assigns a fourth priority (e.g., a medium-high priority) to contextual terms determined based on a body of the email. As another example, and as shown by reference number 532, assume that security device 220 assigns a fifth priority (e.g., a medium-medium priority) to contextual terms determined based on a recipient of the email. As an example, and as shown by reference number 534, assume that security device 220 assigns a sixth priority (e.g., a medium-low priority) to other contextual terms determined based on the email.

Figure 5D:
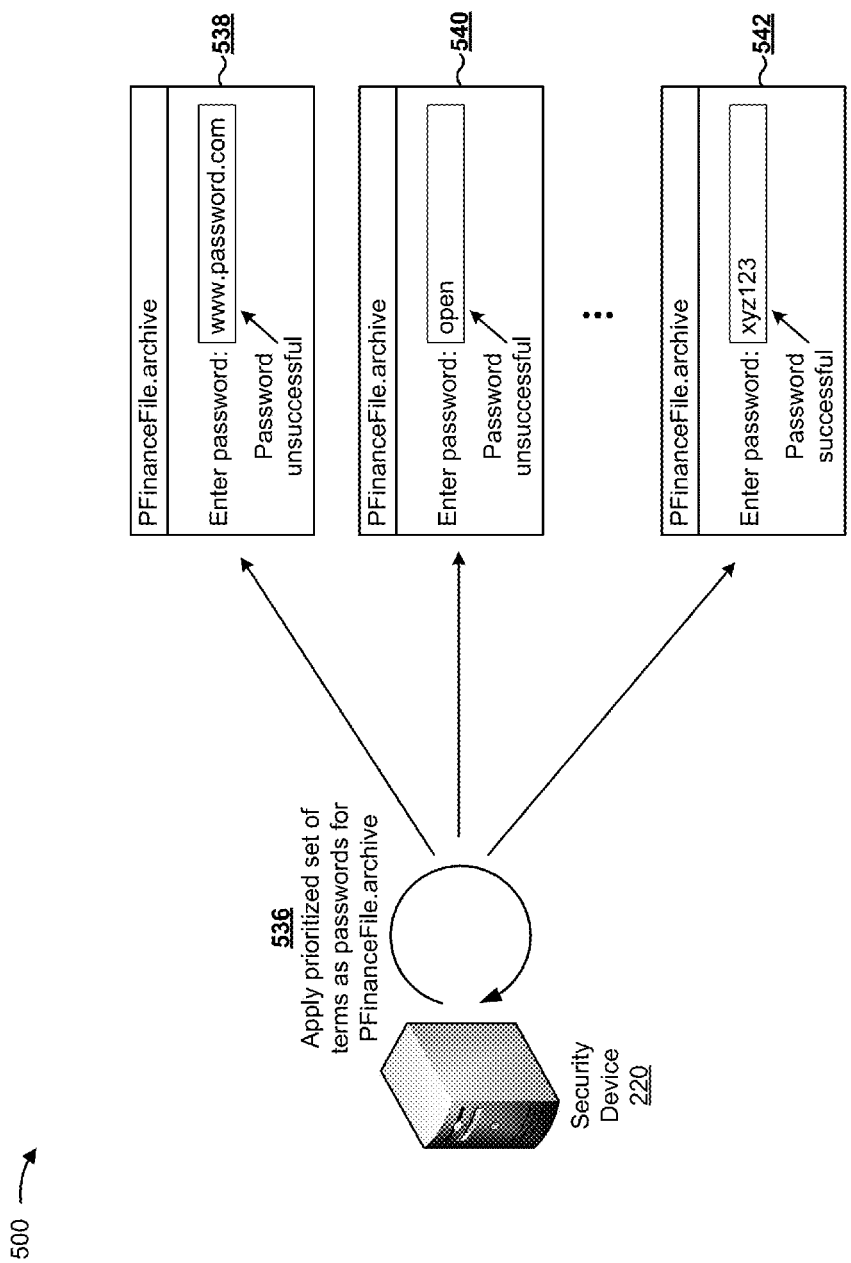

As shown in FIG. 5D, and by reference number 536, security device 220 may apply the set of prioritized terms as passwords for the archive file "PFinanceFile.archive." As an example, and as shown by reference number 538, security device 220 may apply a term with a highest priority first, shown as "www.password.com." As shown, assume that this term is unsuccessful as a password for accessing the archive file. As another example, and as shown by reference number 540, security device 220 may apply a term with a next-highest priority next, shown as "open." As shown, assume that this term is unsuccessful as a password for accessing the archive file. Security device 220 may continue applying terms in this manner until the archive file is accessed. For example, and as shown by reference number 542, security device 220 may apply a term shown as "xyz123" to the archive file. As shown, assume that this term is successful as a password for accessing the archive file.

Figure 5E:
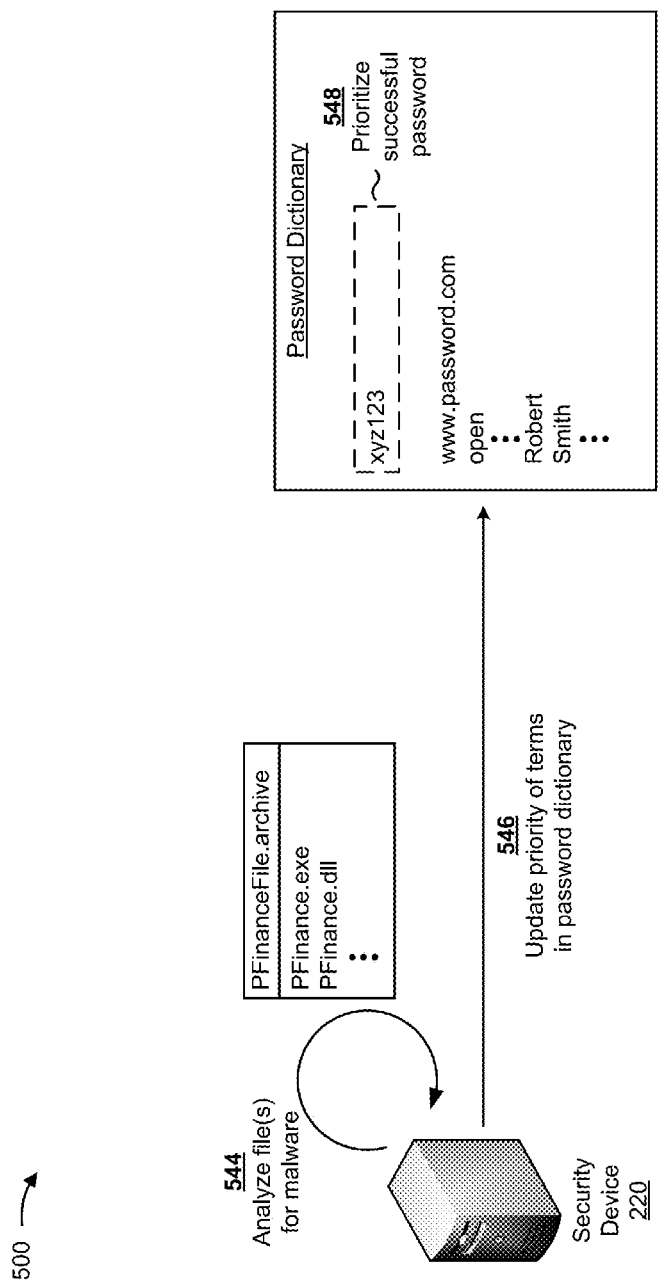

As shown in FIG. 5E, and by reference number 544, based on successfully accessing the archive file using the password "xyz123," security device 220 may analyze one or more files, included in the file archive, for malware. Furthermore, as shown by reference number 546, security device 220 may update a priority of the term "xyz123," which was successfully used as a password, to have a highest priority in the password dictionary (e.g., in the set of prioritized terms). Security device 220 may use this password dictionary at a later time to attempt to access another password-protected file. In this way, security device 220 may permit malware analysis of otherwise inaccessible files, thereby increasing data security. Furthermore, by prioritizing terms to be applied as passwords, security device 220 may conserve computing resources (e.g., memory, processing power, etc.).

As indicated above, FIGS. 5A-5E are provided merely as an example. Other examples are possible and may differ from what was described with regard to FIGS. 5A-5E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
    identify a set of contextual terms associated with a password-protected file;
    store the set of contextual terms in a password dictionary in the memory;
    prioritize the set of contextual terms in the password dictionary to form a set of prioritized terms;
    apply a prioritized term, of the set of prioritized terms, as a password to attempt to access the password-protected file;
    determine whether the prioritized term was successfully applied as the password to access the password-protected file;
    update, based on determining that the prioritized term was successfully applied as the password, a priority of the prioritized term in the password dictionary, the password dictionary indicating an order in which the set of prioritized terms are to be applied to attempt to access a password-protected set of files; and
    analyze, when the password-protected file is protected by the prioritized term as the password, the password-protected file to determine whether the password-protected file contains malware.

2. The device of claim 1, where the one or more processors are further to:
    tokenize text associated with the password-protected file to form the set of contextual terms; and
    where the one or more processors, when identifying the set of contextual terms, are to:
    identify the set of contextual terms based on tokenizing the text.

3. The device of claim 1, where the one or more processors are further to:
    analyze the password-protected file to identify another file that was previously analyzed; and
    determine that a difference between the password-protected file and the other file satisfies a threshold; and
    where the one or more processors, when identifying the set of contextual terms, are to:
    identify the set of contextual terms based on determining that the difference satisfies the threshold.

4. The device of claim 1, where the one or more processors are further to:
    apply one or more transformation techniques to the set of contextual terms to identify one or more additional terms.

5. The device of claim 4, where the one or more transformation techniques include at least one of:
    changing an order of one or more characters; or
    changing case of a contextual term of the set of contextual terms.

6. The device of claim 1, where the one or more processors, when applying the prioritized term, of the set of prioritized terms, as the password to attempt to access the password-protected file, are to:
    apply each prioritized term, of the set of prioritized terms, sequentially as the password to attempt to access the password-protected file.

7. The device of claim 1, where the one or more processors, when prioritizing the set of contextual terms in the password dictionary to form the set of prioritized terms, are to:
    prioritize a first contextual term identified from metadata associated with the password-protected file as having a first priority;
    prioritize a second contextual term identified from metadata associated with an archive file as having a second priority;
    prioritize a third contextual term identified from metadata associated with a source of the password-protected file as having a third priority;
    prioritize a fourth contextual term identified based on tokenizing text included in the source as having a fourth priority; and
    prioritize a fifth contextual term identified based on a previously analyzed file as having a fifth priority.

8. A non-transitory computer-readable medium storing instructions, the instructions comprising:
    one or more instructions that, when executed by one or more processors, cause the one or more processors to:
    identify a set of contextual terms associated with a password-protected file;
    store the set of contextual terms in a password dictionary;
    prioritize the set of contextual terms in the password dictionary to form a set of prioritized terms;
    apply a prioritized term, of the set of prioritized terms, as a password to attempt to access the password-protected file;
    determine whether the prioritized term was successfully applied as the password to access the password-protected file;
    update, based on determining that the prioritized term was successfully applied as the password, a priority of the prioritized term in the password dictionary, the password dictionary indicating an order in which the set of prioritized terms are to be applied to attempt to access a password-protected set of files; and
    analyze, when the password-protected file is protected by the prioritized term as the password, the password-protected file to determine whether the password-protected file contains malware.

9. The non-transitory computer-readable medium of claim 8, where the one or more instructions, that cause the one or more processors to prioritize the set of contextual terms in the password dictionary, cause the one or more processors to:

prioritize the set of contextual terms in the password dictionary based on determining whether a term in the password dictionary was used as a successful password in the past.

10. The non-transitory computer-readable medium of claim 8, where the one or more instructions, that cause the one or more processors to apply the prioritized term, of the set of prioritized terms, as the password to attempt to access the password-protected file, cause the one or more processors to:
apply multiple prioritized terms, of the set of prioritized terms, as the password in parallel to attempt to access the password-protected file.

11. The non-transitory computer-readable medium of claim 8, further comprising:
one or more instructions that, when executed by the one or more processors, cause the one or more processors to:
determine whether every prioritized term in the set of prioritized terms have been applied without identifying a successful password; and
prevent the password-protected file from being accessed based on determining that every prioritized term in the set of prioritized terms have been applied without identifying the successful password.

12. The non-transitory computer-readable medium of claim 8, further comprising:
one or more instructions that, when executed by the one or more processors, cause the one or more processors to:
determine whether every prioritized term in the set of prioritized terms have been applied without identifying a successful password; and
permit access to the password-protected file based on determining that every prioritized term in the set of prioritized terms have been applied without identifying the successful password.

13. The non-transitory computer-readable medium of claim 8, further comprising:
one or more instructions that, when executed by the one or more processors, cause the one or more processors to:
intercept the password-protected file, the password-protected file being intended to be received by a client device; and
where the one or more instructions, that cause the one or more processors to identify the set of contextual terms associated with the password-protected file, cause the one or more processors to:
identify the set of contextual terms associated with the password-protected file based on intercepting the password-protected file.

14. The non-transitory computer-readable medium of claim 8, further comprising:
one or more instructions that, when executed by the one or more processors, cause the one or more processors to:
prevent the password-protected file from being provided to a client device based on determining that the password-protected file contains malware.

15. A method, comprising:
identifying, by a device, a set of contextual terms associated with a password-protected file;
storing, by the device, the set of contextual terms in a password dictionary;
prioritizing, by the device, the set of contextual terms in the password dictionary to form a set of prioritized terms;
applying, by the device, a prioritized term, of the set of prioritized terms, as a password to attempt to access the password-protected file;
determining, by the device, whether the prioritized term was successfully applied as the password to access the password-protected file;
updating, by the device and based on determining that the prioritized term was successfully applied as the password, a priority of the prioritized term in the password dictionary, the password dictionary indicating an order in which the set of prioritized terms are to be applied to attempt to access a password-protected set of files; and
analyzing, by the device and based on the password-protected file being protected by the prioritized term as the password, the password-protected file to determine whether the password-protected file contains malware.

16. The method of claim 15, further comprising:
analyzing a web site that hosts the password-protected file; and
where identifying the set of contextual terms associated with the password-protected file comprises:
identifying the set of contextual terms associated with the password-protected file based on analyzing the website.

17. The method of claim 15, further comprising:
analyzing a message that includes the password-protected file; and
where identifying the set of contextual terms associated with the password-protected file comprises:
identifying the set of contextual terms associated with the password-protected file based on analyzing the message.

18. The method of claim 15, further comprising:
providing the password-protected file to a client device based on determining that the password-protected file does not contain malware.

19. The method of claim 15, further comprising:
receiving the password-protected file from a client device; and
where identifying the set of contextual terms associated with the password-protected file comprises:
identifying the set of contextual terms associated with the password-protected file based on receiving the password-protected file from the client device.

20. The method of claim 15, where identifying the set of contextual terms associated with the password-protected file comprises:
identifying the set of contextual terms associated with a source from which the password-protected file is accessed,
the set of contextual terms including a term included in metadata associated with the source.

* * * * *